Patented June 15, 1943

2,321,674

UNITED STATES PATENT OFFICE 2,321,674

ROOFING AND SIDING GRANULES AND THE LIKE

Norman P. Harshberger, Scarsdale, N. Y., assignor, by mesne assignments, to Carbide and Carbon Chemicals Corporation, New York, N. Y., a corporation of New York No Drawing. Application May 28, 1940, Serial No. 337,578

10 Claims. (Cl. 117—100)

This invention relates to a product and method of making granular materials for surfacing roofing and siding and the like, which granules comprise a cementitious surfacing including a protective waterproof substance. More particularly, the invention relates to individual particles, for example, mineral particles that have received an enveloping coating or casing of an agglutinous emulsion or mixture containing hydraulic cement as the principal ingredient, and from which an emitted surface of the agglutinous substance is formed over the granules. The present application is a continuation-in-part of my copending application Serial No. 83,076, filed June 2, 1936, now Patent No. 2,202,002, granted May 28, 1940, which is a continuation-in-part of application Serial No. 675,451, filed June 12, 1933.

Coated granules have come to be used extensively for the coloration and weather protection of building materials, particularly composition roofing. In the fabrication of the latter type of materials, it has been the custom to embed a layer of individual granular particles into the surface of a waterproof fibrous base which has been previously provided with an adhesive layer of bitumen, for instance, asphalt, to receive them. The most desirable granules for this purpose, because of their permanence of color, wearing qualities, and density, have been the natural stones, and in particular, the natural slates. However, the small variety of colors available and the costliness of these particles have led to the coating and coloration of the commonest ones with artificial coatings. Among the coatings proposed for such purposes have been coatings of Portland cement. The patent to Denning, No. 1,876,630, discloses a product of this character. However, granules coated with such materials have certain undesirable features. Efflorescence occurs due to the liberation of calcium salts or calcium hydroxide to the surface of the cement where, in contact with the atmosphere, calcium carbonate crystals are formed. This scum appears in the freshly formed cement granule and continues to appear as the Portland cement ages. Efflorescence is particularly undesirable where, as generally is the case, the surface is other than white in color, as it not only discolors the exposed cement surface of the granule itself, but these soluble salts also affect the cement coloring matter. More particularly, cement coatings of this character are relatively thin, and accordingly have a limited amount of moisture present for hydration. Where such moisture is evaporated too rapidly as in Denning, who heats the coated granules to accelerate setting, the cement does not properly hydrate and a surface powdering or dusting takes place on the coating, signifying this undesirable condition.

It is the general object of this invention to provide granules presenting a cementitious surfacing including means by which the aforesaid undesirable conditions of efflorescence and surface dusting, either or both, are substantially retarded or overcome.

Other objects of my invention may be enumerated as the provision of a granule having a surface comprising cement and including a water-repellent ingredient adapted to produce an emitted film of such ingredient upon the cementitious surface; a mineral particle having a set and hardened surface coating presenting a water-insoluble film; an individual granular particle having a substantially permanent colored weather-resistant cement coating with the coloring material thoroughly incorporated with the binding vehicle, and which coating is protected by a substantially water-insoluble surfacing; individual granule particles to which have been applied an emulsion comprising hydraulic cement and an agglutinous substance, in which the agglutinous constituent will surround the coated particles with an emitted surface thereof; particles to which have been applied a hydraulic cement coating and an agglutinous coating to prevent dusting of the cement coating; particles prepared from a cementitious composition, which particles have a protective film for the cement; and particles to which have been applied a thermo-setting synthetic resin coating, and which particles have thereafter been heat treated at low temperatures to solidify the resin coating.

Other objects will be apparent from the following description and claims.

In fabricating the coated particles of my invention, I have found a number of processes readily adaptable. Thus, the particle may, for instance, be formed by coating a base core, or may, in its entirety, be made of the coating composition.

Where the coating method is utilized, I have found it desirable and preferable to utilize individual core particles of a porous nature having irregular pitted crevices and irregular craggy outlines. Such particles furnish an excellent surface for coating, and coatings applied thereto become structurally anchored and more capable of resisting chipping and the effects of weather exposure than coatings anchored to particles not possessing these properties. Also, I prefer that the core particles have a composition that will, by chemical reaction, unite them with the applied coatings hereinafter described.

Mineral particles formed from certain cooled liquid residue or slag in the reduction of metallic ores possess these desirable core characteristics. The physical structure of slags is somewhat dependent upon how they are cooled and upon the temperature and humidity of the surroundings, for instance, slag poured upon a dry bank will be less porous than if poured upon a wet bank. For my purpose, I prefer the latter type.

Slags, of the type which I prefer to use as core material, have a composition similar to certain cements and react with water in a similar manner to certain cements, that is, the alumina and silica minerals of the slag react with water to form hydrated aluminates and silicates. Further, when certain cement coatings are applied, this type of slag reacts much more vigorously in the presence of free lime which may be liberated from the cement, than it will with other materials. I prefer to use slags having ingredients, aluminum oxide, silicon oxide, and iron oxide of less than 60% (better less than 50%) by weight of these compositions, and preferably (not less than) between 20% and 50%, and/or slags preferably between 30% and 70% in their calcium oxide and magnesium oxide content, and/or slags having an aluminum oxide and silicon oxide ratio of no less than 1 to 3 by weight.

While a core granule of porous character is preferred for the purpose of my invention, it will be understood that my invention need not be confined to such core material. Examples of other core material I may employ are individual granules of pebbles, crushed coke, crushed brick, crushed gravel, crushed glass, slate, sand, marble, coral, or granulated petrified materials. Other natural or crushed mineral pieces, artificially made particles of mineral material, or particles of organic substances, for instance, cork, may be used where found desirable. The cores may be also preformed granules of cementitious material made in the manner described in my aforesaid copending application, now Patent No. 2,202,002.

In general, the principal constituent for my coating composition or casing will be cement, for example, a hydraulic cement which is a substantially water-insoluble, inorganic, pulverulent material that produces a hardened product when combined with water, setting by a chemical reaction in the presence of the water, and being settable in the absence of free oxygen. Examples of cement I may use and which I label as "efflorescing cements" are the ordinary Portland cements, magnesium cements, for instance, magnesium oxychloride, white Portland cement (a cement of substantially pure Portland type which has been given extremely rapid hardening and high early strength characteristics, and which gives in two or three days the same mortar strength as does the normal or ordinary Portlands in 28 days), high and early strength Portlands which include quick setting characteristics (acquire initial set in less than ¾ hour), these providing better surfacings and requiring less processing as the granular coatings harden more rapidly and obtain considerable strength in the early curing stages. Preferably, I use the high alumina cements more fully described in my Patent No. 2,202,002, for instance, those carrying usually between 60% and 95% of calcium aluminates or calcium alumina ferrites. I prefer those made by fusion and in the manner to be substantially entirely free of free lime, since the coating thereof has a high degree of freedom from efflorescence by reason of soluble salts in the form of calcium oxide or calcium hydroxide liberated to the surface during the setting reaction or upon exposure.

The cements may be extended with suitable aggregates and, when combined with a proper amount of water and/or other liquids, are such as to yield a hard and dense surface. The extending materials may include coarse and/or fine aggregates, for instance, marble dust, diatomaceous earth, crushed slag, sand, crushed glass, long or short fibers of mineral, animal and/or of vegetable character, such as asbestos, cotton linters, hair; coloring agents, for instance, colored mineral oxides, or chrome or iron oxide, dyes, such as coal tar dye; and waterproof and adhesive substances such as natural and synthetic resins or asphalt. These additions, one or more, may be mixed with the cement in such proportions as the character and requirements of the products to be made will allow.

The amount of water to be used with the cement will depend somewhat upon the type of mix and will readily be determined in actual practice. A water-cement ratio of 0.7–0.9 has in many cases been found satisfactory. Such should be adequately controlled in order to insure proper hydration. In the case of high alumina cement compositions, excess water may be used without serious effect.

Because of the small amount of cement composition in a single granule, it is desirable in certain instances, as a further aid to hydration, to accelerate the set of the coating. In such instances, a quick setting Portland cement may be employed or preferably a high alumina cement, which has been given quick setting properties by the addition of calcium sulphate in the form of gypsum or plaster of Paris (commercial grade) in amounts of approximately 2%, which amount may be varied according to the conditions of set acceleration desired and according to the type of and proportion of aggregates included in the cement. Care should be exercised not to include such amounts as will materially affect the durability of the finished product. Where a slag core is coated with the high alumina cement composition, such addition may not be necessary as, in the chemical combination of these materials, any free lime of the slag will tend to accelerate the set.

In using the aforesaid cements with or without aggregate materials, I add a suitable agglutinant which will produce an emitted film or surfacing of such substance upon the face of the freshly coated or formed cement granules. Thus, I may use, for instance, a wax, an oil, or an asphalt of a nature that will not materially weaken its setting qualities, or I may also use, for instance, such materials as varnishes comprising natural resins or gums, synthetic resin compositions, which may also be oil compositions of which phenolic and vinyl resins in suitable solvents are examples. One or a combination of two or more agglutinants in a combined form, in an emulsified state, or otherwise may be used in any instance. Where a hard wax is employed, I prefer it to be in an emulsified state. Also, the agglutinants may be transparent or contain color.

I have found the most suitable amount of agglutinant to be added to the cement to be from a fraction of 1% to 10%, depending upon the agglutinant used. When the agglutinant is added to the aqueous cement composition, an emulsion is set up on mixing, and when the particle cores have been coated or particles formed from the composition, an emitted film or surfacing of the agglutinant will substantially surround them. Obviously, the agglutinant will also extend into the cement casing or structure that is formed, thus assuring excellent anchorage for the surface film.

As an example of applying my invention, I mix 100 parts by weight of hydraulic cement and 7 parts by weight of red oxide with 5 parts by weight of a phenolic resin oil varnish, then add 70 parts by weight of water and stir rapidly to form an emulsion. I then add 1000 parts by weight of No. 11 silica roofing granules and agitate the mixture until the granules are fully coated. The coated granules are then separated from any excess coating material and agitated by suitable means until the coating has set sufficiently for handling.

As another example, and using the same procedure, I employ 100 parts of high aluminate cement, 10 parts of a 50% paraffin emulsion, 7 parts red oxide, 65 parts of water, and 1000 parts of No. 11 trap rock granules.

The agglutinant addition and its emitted film provide many advantages. It helps retain necessary water of hydration in the cement coating or mass during the period of set and hardening. Thus, it is particularly helpful in controlling hardening of cements requiring substantial periods of cure. It aids in the retention of color where certain types of coloring material are used for economy. It aids in preventing dusting of the cement composition where curing conditions are not favorable, such as where surface drying of the cement is possible due to the presence of non-humid air or where heat is used for set acceleration, or where it is generated in the cement composition itself during setting as with high aluminate compositions. It reduces efflorescence in cement compositions that liberate CaO or $Ca(OH)_2$ to a minimum by substantially blocking its migration to the surface.

The aforesaid coating compositions comprising the cementitious ingredient, extending material, if any, water and agglutinant, are made up as a slurry of desired consistency, and with such material I mix granular particles such as described above, which have been previously crushed or screened to the desired size or sizes and preferably thoroughly washed and, in certain instances, dried by passing through a suitable drying chamber. Preferably, the particles are kept wet as this assists in setting of the coating composition. The particles employed may be of one type or a mixture of several, and, in general, will be between 8 and 30 mesh in size, which is the size of particles generally used for roofing and siding material, to which the invention is particularly directed. It will, of course, be understood that the sizes of the particles to be coated may be larger or smaller, as the conditions will require.

By suitable means, well known to the art, the particles are thoroughly mixed with the cement coating composition, the mixture being preferably kept in motion until each particle has been fully coated. Such action is also desirable as the coated material, if it be a colored one, has its pigment addition kept well distributed. Thereafter, the surplus coating material, if a thin slurry has been employed, is allowed to run off or is otherwise removed and the coated particles are either kept agitated or passed on to a suitable separating conveyor until they have taken their initial set, or they may be permitted to set and harden in bulk. In the latter instance, if the particles are somewhat bonded together, I may put the mass through a crushing process to again separate the particles. After setting, the coated particles are permitted to harden at any desired rate by suitable controlling means regulating the conditions surrounding the particles.

A further process of coating I have found satisfactory in certain cases comprises feeding on to a screen type conveyor particles that have been washed or that are to be washed while in motion by a water spray or by passing through an agitated water bath, and thereafter applying the cement coating composition by suitable means, as by spraying or impelling to the particles. The surplus material is permitted to drain off and is forced through the cement conveyor apparatus into suitable collecting receptacles and the individual particles are then permitted to set and harden, after which they are collected for any further processing.

An additional process of coating, which is particularly adapted to coating porous particles, comprises using relatively moisture-free particles of preferably substantially uniform size, and placing a batch of such pieces in or on a suitable device, to which there is added a measured amount of dry pulverulent cement of the types hereinbefore mentioned and preferably of a size about 400 mesh, although coarser material may be employed under certain conditions. This aggregate is agitated or mixed thoroughly to permit the minute parts of the dry coating to cling to the surface of the particle and, where a porous particle is being used, to permit the material to fill the voids. Simultaneously or otherwise, moisture may be introduced into the aggregate of particles, by suitably injecting steam or vapor or moisture laden air, or by allowing moisture to filter through the aggregate to be absorbed by the cement, causing it to set and harden. The water of hydration in this case may be in the form of a water emulsion containing the above agglutinants, or it may be a vapor carrying the same. By either method, the surfaced particles will be protected by a film of the agglutinant.

As a part of the process, I also contemplate producing particles, by suitable means, from the cement agglutinant composition I use for coating cores, the composition being changed to the solid or semi-solid state during processing, and bearing a film of the agglutinant. For instance, globules of the composition may be propelled by centrifugal means, spraying, etc., into space in a suitable chamber, preferably with suitable temperature control, so that the resultant solidification takes place before their landing upon a collection surface.

I have sometimes found it desirable, preferably after the cementitious composition has set and its emitted film of agglutinant has been formed, to further recoat the particles with any of the types of agglutinants I have mentioned. Such preferably is a transparent coating where the under surface is colored, and may be a heat hardening synthetic resin, which may be baked at preferably low temperatures in suitable chambers until the resin coating has dried and hardened into a non-softening film. Cement compositions of a high alumina character are preferred where baking is intended, as, once hardened, it is substantially unaffected by heating and cooling. I have also found it desirable, when wash coating of cements of the lime liberating type are used, to charge the liquid ingredients with carbon dioxide as a further aid in retarding efflorescence during the period in which the cement takes its first set.

The natural or colored cementitious particles of my invention may be utilized in the continuous manufacture of shingles from a moving web of composition material wherein a moving base is saturated with a suitable waterproofing substance, for instance, a low melting point asphalt, and is provided with a surface coating of, for instance, a high melting point asphalt. Before the coating has fully set, the particles of the invention are fed from a suitable means, for instance, a hopper, and spread over the web, and are then partially embedded therein by passing the web around suitable embedding rolls. The presence of the agglutinant film will aid in anchoring the granules to the bitumen. The coated granule studded web is then cut into shingle sizes of any desired form and size.

The cement particle of my invention, including emitted agglutinant, may be usually distinguished from the cement granule of my invention wherein no agglutinant is included in the cement composition but is subsequently attached by coating, by means of fines of the cement which migrate to the surface in the case of the emitted agglutinant and remain intermingled with the surface agglutinant. Such cement faces are not present in the surface agglutinant applied as a coating over the cement body.

From the foregoing description, it will be manifest that I have presented entirely new cementitious granules and process of making such granules. When the cementitious composition has set and hardened, granules are produced which may have a surface of a durable and substantially insoluble character, substantially free from efflorescence and cement dusting, and with its color intimately bound in and permanent. Also, the processes employed are simple to carry out and economical, and I may utilize inexpensive particles of a porous type that ordinarily, when exposed to the elements, would disintegrate. Moreover, when proceeding in accordance with the foregoing description, I may produce discrete mobile particles comprising a hardened, cementitious composition including an agglutinous surface film, which particles are useful as a grit surfacing for roofing and siding material to protect the asphalt coating thereon from the atmospheric elements and to provide, when desired, a means of obtaining permanent coloration, ornamentation, and designs; also, that the particles may be employed as studding in cement blocks or other building materials.

It will be evident that many changes may be made in the granule structure and process of making them, and it is therefore desired that the invention be construed as including all equivalents and as broadly as the following claims may allow. The term "cement," when used in the specification or claims without further qualification, is intended to include not only hydraulic cements but all allied structural cements that depend upon water for setting and which provide weather resistant coatings.

I claim:

1. As an article of manufacture, an individual granule having a hardened cement surface comprising an aluminate cement and having on the exterior thereof a hardened coating comprising a thermo-setting resin.

2. As an article of manufacture, an individual granule having a hardened surface comprising cement and a water-insoluble waterproofing agglutinant and having on the exterior thereof an emitted film comprising said agglutinant.

3. As an article of manufacture, individual mineral particles having a hardened coating comprising hydraulic cement and a water-insoluble waterproofing agglutinant, said coating substantially completely enveloping the particle and said agglutinant being dispersed through the hydraulic cement and providing a cement dust preventing encasing film on the exterior of said coating.

4. As an article of manufacture, a coated granule for weather exposure comprising a mineral particle, a hardened enveloping coating on said particle comprising a high aluminate hydraulic cement, and an outer heat dried and hardened enveloping coating on said cement coating comprising a synthetic resin composition.

5. A process of producing surfacing granules comprising forming granules with a plastic cement surface and forming on the cementitious surface of said granules before the cement has set a dust and hardening control film comprising a water-insoluble waterproofing agglutinant.

6. A process of producing cement coated surfacing elements comprising coating core particles with coating material comprising cement, and prior to full setting thereof forming on said cement a hardening control film comprising a water emulsion of a water-insoluble waterproofing agglutinant.

7. A process of treating individual granular particles which comprises providing individual granular particles, forming an aqueous composition comprising hydraulic cement and synthetic resin, treating the particles with an enveloping coating of said composition, and permitting an emitted film of the resin to form to control curing of the coated particles.

8. The process of coating the hereindescribed individual porous slag particles comprising mixing said particles with a slurry comprising hydraulic cement, keeping said mixture in motion until said particles are fully coated, separating the particles and surplus slurry, applying a synthetic resin-oil composition to the cement coated particles before the cement has fully set, and agitating said coated particles until said coatings are set and hardened.

9. A process of coloring individual granular particles comprising providing a hydraulic cement mixture containing coloring pigment, intimately mixing therewith granular porous slag particles to fully coat and envelop said particles and to keep said coloring pigment in suspension to provide uniform coloration, separating said coated particles from the mixture, and applying a transparent coating comprising a synthetic resin-oil composition to the cementitious coating before the latter has fully set to control the hardening thereof.

10. A process of producing surfacing granules comprising forming granules with a cement surface comprising a quick setting and high early strength cement composition, and forming on said cementitious surface before it has fully set a dust and hardening control film comprising a water-insoluble waterproofing agglutinant.

NORMAN P. HARSHBERGER.